O. T. DAVIES.
Ditcher and Cultivator Combined.
No. 202,416. Patented April 16, 1878.
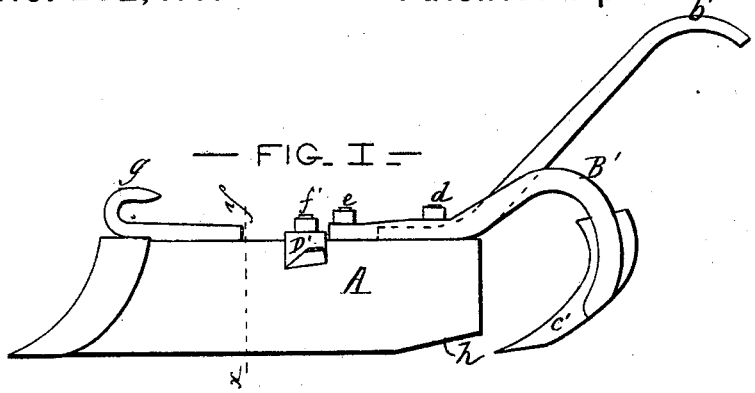
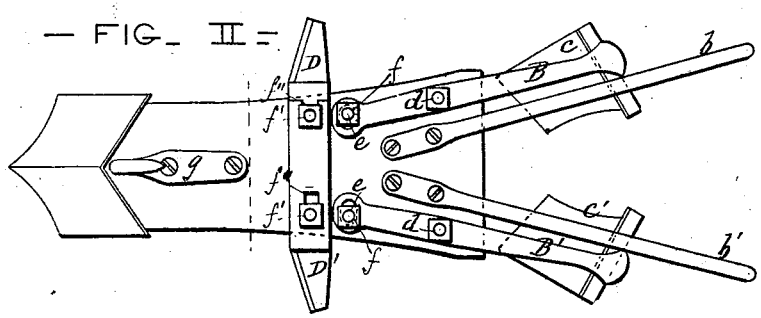
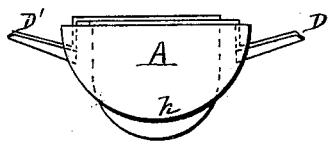
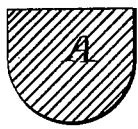
WITNESSES
C. B. Vickery
W. T. Hutchinson
INVENTOR
Owen Thomas Davies,
by G. H. & W. T. Howard
Attys.

UNITED STATES PATENT OFFICE.

OWEN T. DAVIES, OF BRIGHTON, CALIFORNIA.

IMPROVEMENT IN DITCHER AND CULTIVATOR COMBINED.

Specification forming part of Letters Patent No. 202,416, dated April 16, 1878; application filed December 26, 1877.

*To all whom it may concern:*

Be it known that I, OWEN T. DAVIES, of Brighton, Sacramento county, California, have invented an Improved Ditcher and Cultivator Combined, of which the following is a specification, reference being had to the accompanying drawing, and to the letters of reference marked thereon.

This invention is specially designed for the use of fruit-raisers in localities where irrigation is necessary or advisable in order to produce fruit of superior quality; but, as a compound implement, the invention is adaptable to various uses by the general agriculturist.

In the annexed drawing, Figure 1 is a side view of the invention. Fig. 2 is a top view of the same. Fig. 3 shows the shape of the rear end of the body of the implement. Fig. 4 is a cross-section at $x\,y$, showing the shape and construction thereof at that point.

Similar letters of reference indicate similar parts of the invention in all the views.

A is the body of the implement, formed, preferably, of a block of wood, and having its sides and bottom covered with sheet-iron, zinc, or other metal, to keep it from injury. The block constituting the body A is flared or tapered outward for a portion of its length to its rear end, as shown in Fig. 2, and pointed at its front end, as also shown in the same figure. The front pointed end is also inclined, as shown in Fig. 1, there being a right-handed and a left-handed mold-board placed thereon, as shown, at the ordinary angle of inclination. The bottom edges of the mold-boards are flush with the metallic cover of the body A.

At the rear of the body are placed the ordinary handles $b\ b'$. B B' are plow-beams, carrying blades $c\ c'$, which incline inward, as shown. Each of the plow-beams B B' is attached to the body A at two points—viz., at $d$ and $e$—the attachment at $d$, being pivotal, admitting the beam to be moved laterally, the slot $f$ at the end of the beam allowing it to be so moved when the bolt $e$ is loosened.

Knives D D' are secured to the top of the body by bolts $f'$, as shown, the bolts passing through slots $f''$ in the knives, which admit of the lateral extension of the same. The knives are placed one above the other, and their cutting-edges are inclined somewhat downward and backward. An extensible draft-hook, $g$, is placed at the front end of the body A.

In using the implement in the cultivation of fruit—strawberries, for instance—the method employed is as follows: The ground is first leveled in the direction of the proposed ditches. The plow-beams B B' and blades $c\ c'$ and knives D D' having been detached from the implement, the ditcher then only remaining, the ditcher is run along, cutting a ditch about twenty-one inches wide. The ditches thus cut are placed about seven feet apart, and the top is smoothed off. The strawberry-vines are then set three and one-half feet apart between the rows, and from sixteen to twenty inches in the row. The water is then let into the ditch, to which it is periodically supplied. When weeds have grown near the rows of vines and in the ditch, the extension-knives D D' and blades $c\ c'$ are placed on the implement and adjusted to the desired position, and the ditcher is run along the ditch, the knives cutting the weeds between the edge of the ditch and the vines, and the blades turning the weeds and earth over into the ditch, leaving it flat. After the weeds have grown again the knives and blades $c\ c'$ are removed, and the ditcher is run through the ditch, throwing it again into its original round shape.

The implement may be used in orchards without employing the knives and blades $c\ c'$, and therefore I desire to claim it separated from these devices.

The widening or flaring of the body A is intended to enable the dirt to be crowded out behind without throwing it on the vines. The under rear part of the body is inclined upward toward the blades, as shown at $h$; for, as the horse draws the implement, there is a tendency of its front end to rise, and the shape of the part at $h$ allows the blades $c\ c'$ to sink better into the earth.

In raising strawberries it is necessary to cultivate the vines five or six times a year, and the use of this implement effects a great saving of time and labor.

Having described my invention, what I claim as new, and wish to secure by Letters Patent of the United States, is—

1. A ditching-machine consisting of a round-bottomed body, widened toward its rear end, and having at its front end a right and left handed mold-board, and provided with handles, substantially as specified.

2. The body A, having its bottom rounded and its rear end flared, and provided with right and left handed mold-boards at its front end, as described, combined with laterally-extensible weed-knives, substantially in the manner and for the purposes specified.

3. The body A, provided with a rounded bottom and flaring rear end, as described, combined with front right and left handed mold-boards and rear adjustable plow beams and blades, substantially as herein set forth.

4. In a ditching-machine, a round-bottomed body having a widened or flaring rear end, and carrying plow beams and blades, as described, the upward-inclined part $h$, whereby the blades, when the front end of the implement is raised in being drawn, are allowed to sink into the earth.

5. A compound implement consisting of a round-bottomed body having a widened or flaring rear end, a right and a left handed mold-board at the front end, a pair of extensible weed-cutting knives, a pair of adjustable plow beams and blades, and suitable handles, combined substantially as and for the purposes specified.

In testimony whereof I have hereto subscribed my name, in the presence of two subscribing witnesses, this 6th day of September, A. D. 1877.

OWEN THOMAS DAVIES.

Witnesses:
   H. LADD,
   GEORGE W. HARLOW.